(12) United States Patent
Wabnegger et al.

(10) Patent No.: US 10,962,170 B2
(45) Date of Patent: Mar. 30, 2021

(54) METHOD AND APPARATUS FOR PROVIDING TEMPORARY SUPPORT AND A MEANS FOR RELOCATING ENERGIZED ELECTRICAL CONDUCTORS

(71) Applicant: Quanta Associates, L.P., Houston, TX (US)

(72) Inventors: David Karl Wabnegger, Burnaby (CA); Daniel Neil O'Connell, Burnaby (CA); Ian Edward Trip, Penticton (CA)

(73) Assignee: Quanta Associates, L.P., Houston, TX (US)

( * ) Notice: Subject to any disclaimer, the term of this patent is extended or adjusted under 35 U.S.C. 154(b) by 134 days.

(21) Appl. No.: 16/417,251

(22) Filed: May 20, 2019

(65) Prior Publication Data

US 2019/0277444 A1 Sep. 12, 2019

Related U.S. Application Data

(60) Continuation-in-part of application No. 14/946,474, filed on Nov. 19, 2015, now Pat. No. 10,295,115, (Continued)

(30) Foreign Application Priority Data

Jul. 21, 2010 (CA) ..................................... 2710631

(51) Int. Cl.
*F16M 13/02* (2006.01)
*H02G 1/04* (2006.01)
(Continued)

(52) U.S. Cl.
CPC ............ *F16M 13/022* (2013.01); *H02G 1/02* (2013.01); *H02G 1/04* (2013.01); *H02G 7/05* (2013.01)

(58) Field of Classification Search
CPC . B66C 23/18; H02G 1/02; H02G 1/04; H02G 7/05; H02G 7/053; F16M 13/02; F16M 13/022
See application file for complete search history.

(56) References Cited

U.S. PATENT DOCUMENTS 3,785,462 A * 1/1974 Coad ........................ B66F 7/065
187/262
4,846,445 A * 7/1989 Pfeffer ...................... E02D 9/02
254/30
(Continued)

*Primary Examiner* — Tyrone V Hall, Jr.
(74) *Attorney, Agent, or Firm* — Oathout Law Firm; Mark A. Oathout; Antony C. Edwards

(57) ABSTRACT

A conductor lifter adapted to be mounted to a tower for temporarily supporting an energized conductor comprises a support arm having a base end and an opposite cantilevered end and a crank arm pivotally mounted on the cantilevered end, the crank arm having lower and upper crank arms. A first actuator is coupled to the support arm, and an elongate member is mounted to, so as to extend between, the upper crank arm and a first driver of the first actuator so as to rotate the crank arm about the pivotal coupling when the first actuator is actuated. A lower end of the lower crank arm is selectively elevatable by a second actuator relative to the upper crank arm so as to elevate a conductor when held by a conductor retainer on an insulator mounted to the lower crank arm. A method for using the conductor lifter is also provided.

18 Claims, 22 Drawing Sheets

Related U.S. Application Data which is a division of application No. 13/810,634, filed as application No. PCT/CA2011/000902 on Jul. 21, 2011, now Pat. No. 9,197,041.

(60) Provisional application No. 61/344,432, filed on Jul. 21, 2010.

(51) Int. Cl.
*H02G 1/02* (2006.01)
*H02G 7/05* (2006.01)

(56) References Cited

U.S. PATENT DOCUMENTS

| | | | |
|---|---|---|---|
| 5,538,207 A * | 7/1996 | O'Connell | H02G 1/04 182/2.11 |
| 5,662,451 A * | 9/1997 | Muzzi | B66C 23/44 414/540 |
| 6,101,889 A * | 8/2000 | Laskey | F16H 25/2204 116/282 |
| 7,520,398 B1 * | 4/2009 | Ledman | B66C 23/18 212/179 |
| 2009/0206305 A1 * | 8/2009 | Devine | H02G 1/04 254/134.3 PA |

* cited by examiner

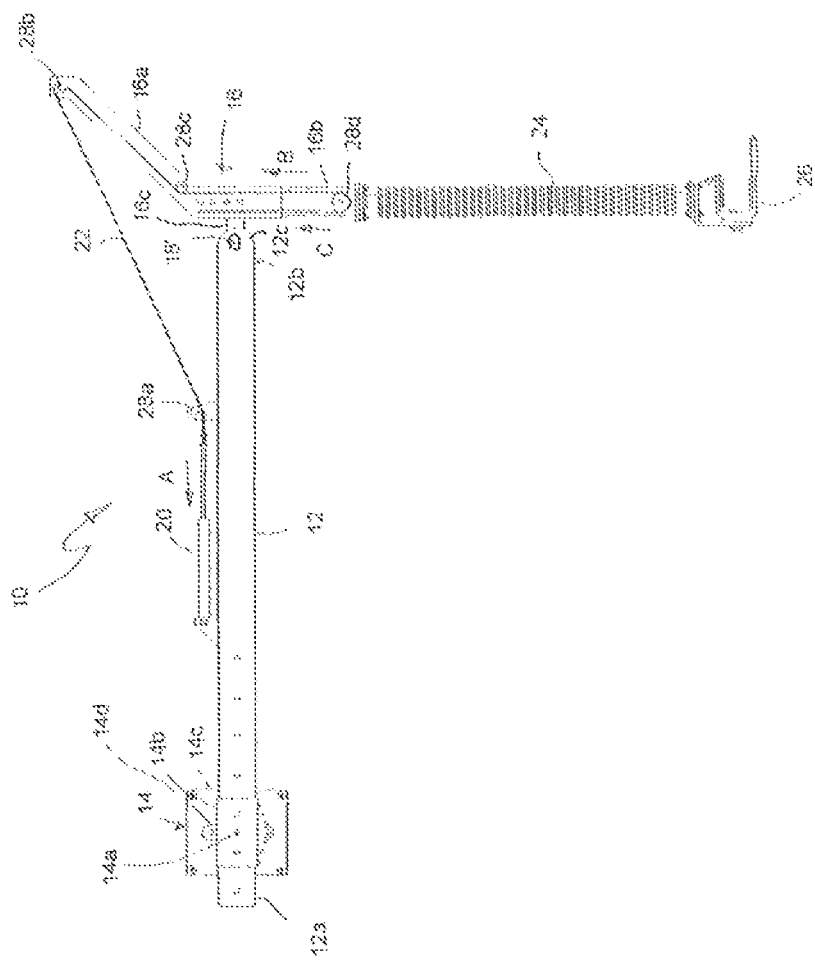

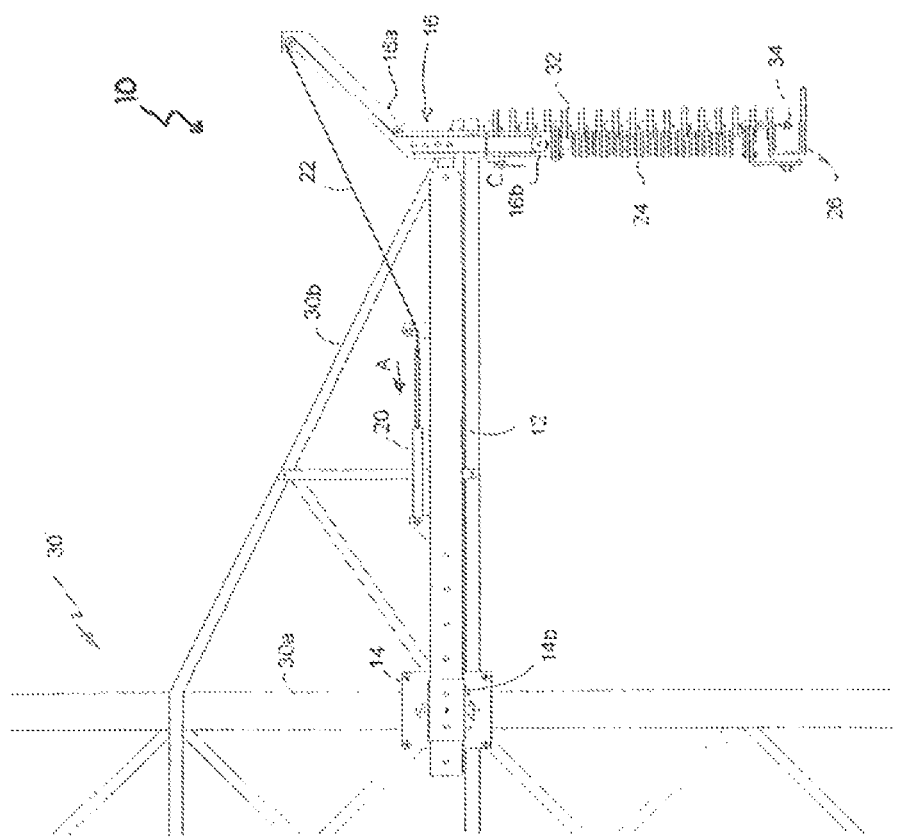

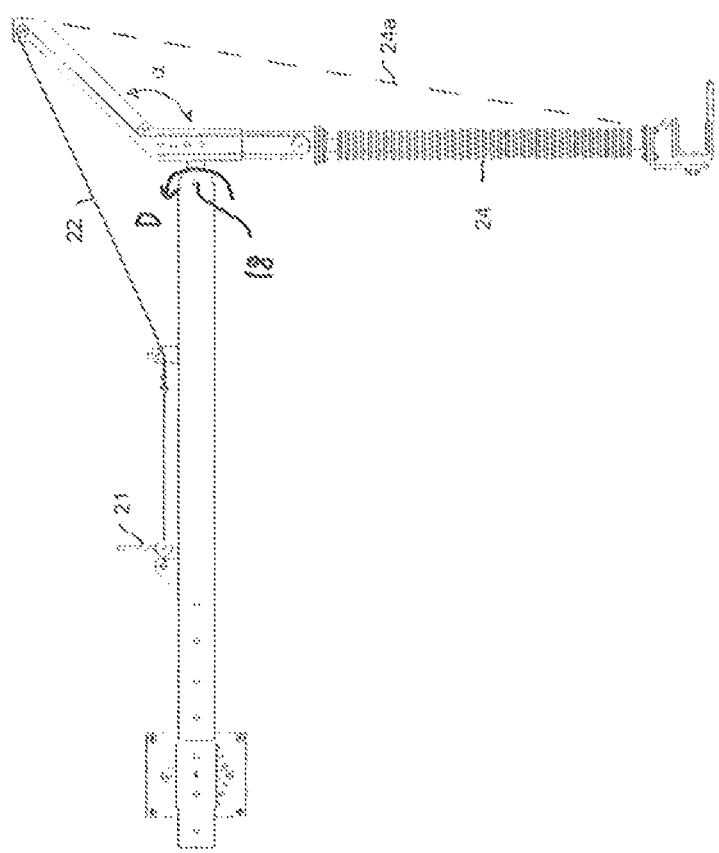

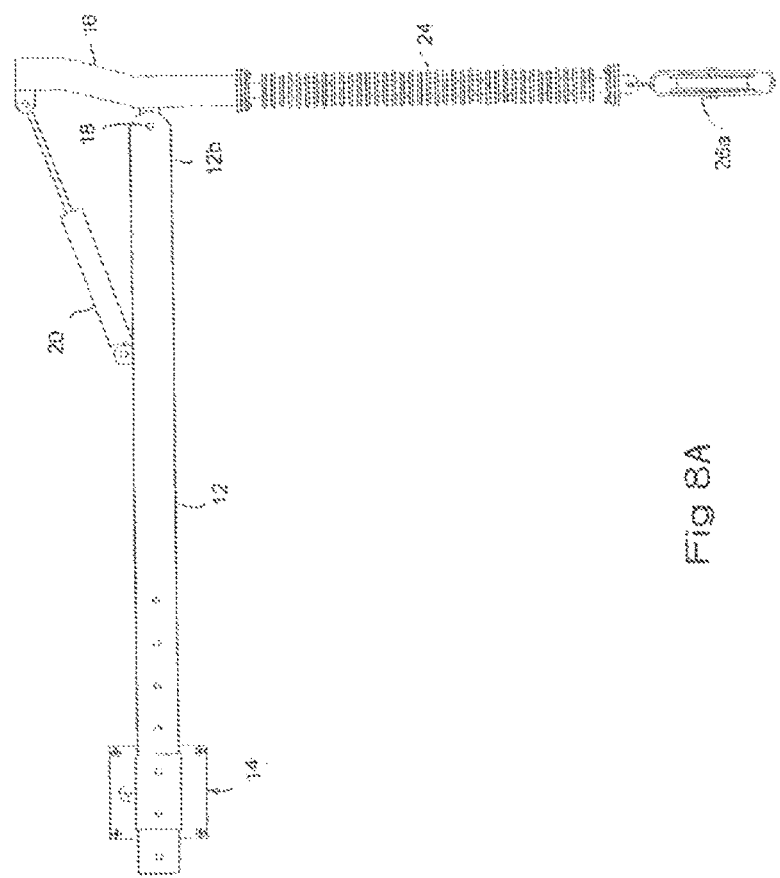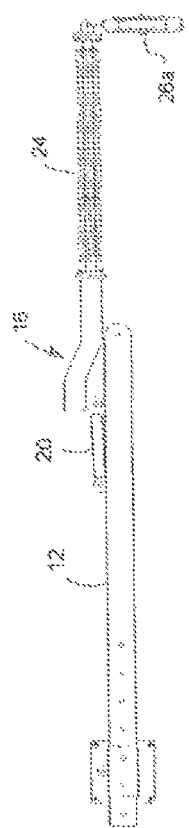
Fig 8A
Fig 8B

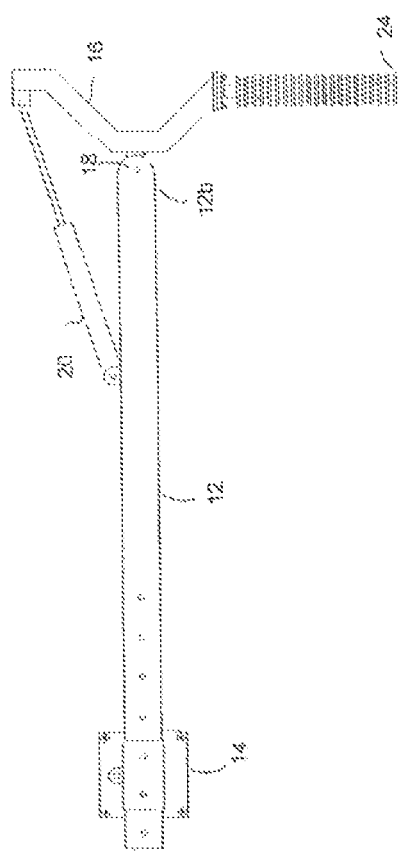
Fig 9A
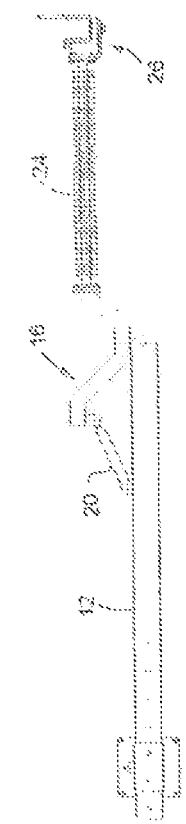
Fig 9B

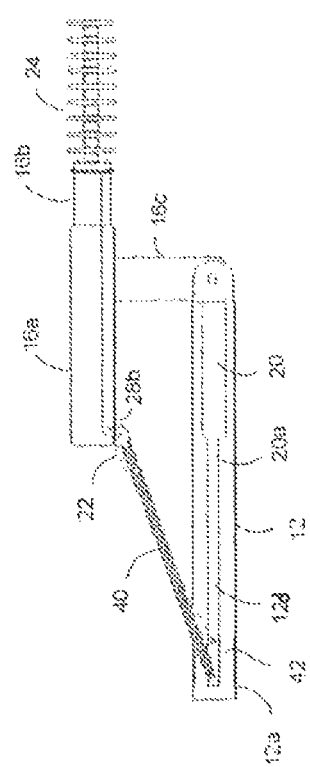

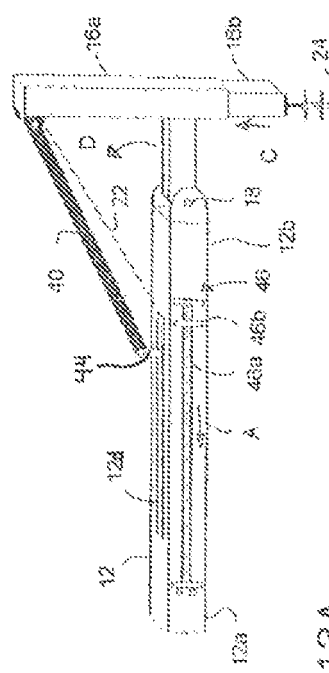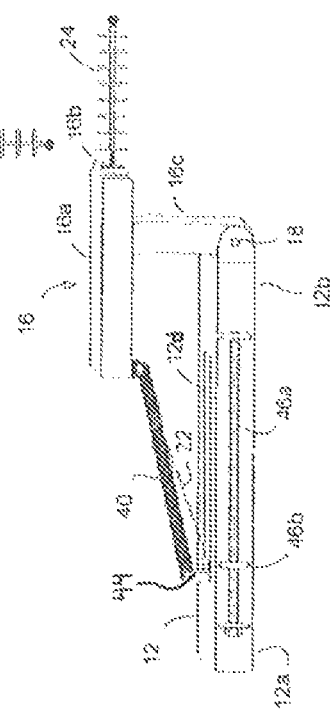
Fig 13A
Fig 13B

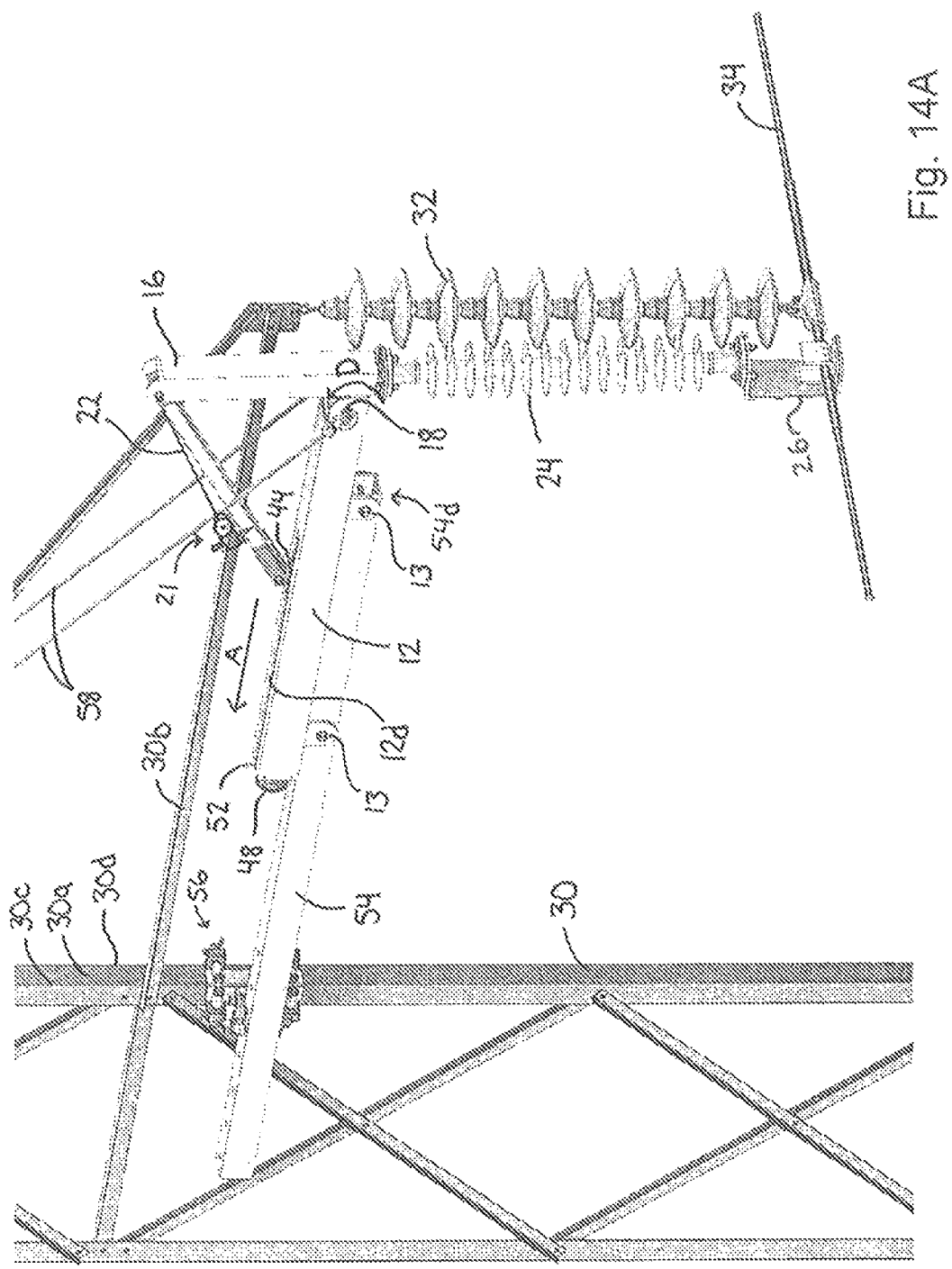

US 10,962,170 B2

METHOD AND APPARATUS FOR PROVIDING TEMPORARY SUPPORT AND A MEANS FOR RELOCATING ENERGIZED ELECTRICAL CONDUCTORS

CROSS-REFERENCE TO RELATED APPLICATIONS

This is a continuation-in-part of U.S. patent application Ser. No. 14/946,474 filed Nov. 19, 2015 which in turn is a division of U.S. patent application Ser. No. 13/810,634 filed Jan. 16, 2013 (now U.S. Pat. No. 9,197,041). U.S. patent application Ser. No. 13/810,634 is a National Stage Entry of Patent Cooperation Treaty Application Number No. PCT/CA2011/000902 filed Jul. 21, 2011, which in turn claims priority from U.S. Provisional Patent Application No. 61/344,432 filed Jul. 21, 2010 and Canadian Patent Application No. 2,710,631 filed Jul. 21, 2010. All of the applications referred to in this paragraph are entitled "Method And Apparatus For Providing Temporary Support And A Means For Relocating Energized Electrical Conductors". Entireties of all the applications referred to in this paragraph are incorporated herein by reference.

FIELD

This disclosure relates to the field of repair or replacement of high voltage power lines or the supporting structures, insulators and the like related to same, and in particular, to a manually actuable lightweight device for mounting onto a high voltage line tower for the insulated acquisition and relocation of an energized electrical conductor supported by the tower.

BACKGROUND

As recognized by Pigott et al in U.S. Pat. No. 6,434,810, which issued Aug. 20, 2002 for a Method for High Voltage Power Line Repair, high voltage power lines have been constructed to extend from spaced towers high above terrain which is practically inaccessible to land vehicles. As such, a number of methods and devices have been developed to facilitate the repair of high voltage power lines by helicopter, where such power lines are suspended from each support tower by elongate insulators. Pigott et al describe that such helicopter-facilitated repairs have been extremely difficult and time consuming to perform, in that the tension on the power line must be broken so that the line can be lifted out of its support shoe to facilitate the line repair. In an attempt to alleviate this problem, linemen have tried to winch the line upward from the crossbar at the top of the tower.

Consequently, Pigott et al teach temporarily attaching a template to the yoke plate, which supports a plurality of power lines, so as to receive and position winch lines on opposite sides of the yoke plate directly above a power line. The winch lines are described as extending from the template to a hand winch, and from the hand winch to attachments with the power line on opposite sides of the yoke plate. The winch lines are described as extending downwardly to connections with the power line spaced outwardly on opposite sides of the yoke plate, and that the winch lines are used to draw the power line upwardly towards the template so as to raise the power line out of contact with the yoke plate.

Thus Pigott et al addresses generally the problem to which the present disclosure is addressed; namely, that, because maintenance and refurbishment of critical transmission and distribution lines often requires the lines to remain energized and operational during the maintenance procedures, this requires the conductors to remain live while being temporarily relocated and remain thus insulated from ground and other conductors so as to provide a safe working zone when the energized conductor has been temporarily relocated, allowing safe replacement of hardware, insulators in the working zone or the placement of new conductors. Pigott et al also address the problem that it is often impractical to move cranes or other ground-based support vehicles adjacent to the tower or other energized conductor supporting structures to facilitate the support and relocation of the energized conductor to allow maintenance and refurbishment. Examples of ground-based support vehicles and attachments to ground-based support vehicles, such as cranes, are found for example in U.S. Pat. No. 5,538,207 which issued Jul. 23, 1996, to Devine et al for a Boom Mountable Robotic Arm; U.S. Pat. No. 6,837,671, which issued Jan. 4, 2005 to Devine et al for an Apparatus for Precisely Manipulating Elongate Objects Adjacent to and Such as Energized Overhead High Voltage Transmission Lines; and U.S. Pat. No. 7,535,132 which issued May 19, 2009 to Devine et al for a Live Conductor Stringing and Splicing Method and Apparatus.

In the prior art, applicant is also aware of U.S. Pat. No. 1,235,999, which issued Aug. 7, 1917 to Neeley for a Repair Device for High Voltage Electric Transmission Lines. Neeley describes a device adapted to be utilized by workmen for replacing broken or damaged insulators which carry overhead electric conductors, and for effecting an immediate attachment of the line wires to the insulators, even where the wires are live or charged with current. By way of background, Neeley states that overhead lines for conducting electricity generally embody a support consisting of a pull and one or more cross arms, insulators applied to the cross arm at opposite sides of the pole, and live wires attached through the medium of the insulators to the support, and that an important feature in the repairing or upkeep of such lines resides in the renewal or replacement of insulators, which may become damaged or broken. To provide for this, Neeley discloses a repair device for high voltage electric transmission lines which includes a saddle adapted to be adjustably positioned on a cross arm, a pin removably seated in the lower portion of the saddle for retaining the saddle on the cross arm, a loop pivotally connected to the pin to one side of the saddle, a lever carried by the loop, an insulator carried by one end of the lever, and a wire engaging member on the insulator.

SUMMARY

The present disclosure is directed to the problem presented to linemen who are required to maintain or refurbish transmission and distribution lines which must remain energized, but without the use of ground-based support vehicles and prior art manipulator attachments, either due to the terrain, or the encroachment or abandonment of rights of way adjacent to the affected transmission line towers. The solution, according to the present disclosure, is to support a single energized conductor, whether for example it be a single phase, a single bundle or the like, and to clear the single conductor out of the work zone; that is, out of the way of the area where the linemen must perform the maintenance or refurbishment. In particular, the solution provides a relatively lightweight (for example, manufactured of aluminium), elongate, rigid mounting arm, and corresponding mounting bracket on one end of the arm, the other end of the arm supporting a pivotally mounted insulator depending downwardly from a crank arm, wherein the upper end of the crank arm is attached to an actuator which, upon actuation, pivots the crank arm and insulator about the end of the support arm so as to rotate up and out of the way an energized conductor contained in the wire holder at the bottom end of the insulator. The support arm is temporarily mounted to an existing transmission line tower or pole (collectively herein, a tower) so as to extend outwardly substantially horizontally therefrom, thereby cantilevering outwardly of the tower the end of the arm supporting the crank arm and insulator.

It is advantageous, however, to firstly vertically lift the conductor by a short distance, for example so as to clear the conductor from its existing conductor holder on the existing insulator which ordinarily holds the conductor, prior to rotating the conductor out of the way by pivoting the crank arm. To accomplish the short vertical lift of the conductor, a vertical actuating mechanism is employed. The vertical actuating mechanism is actuated in sequence with the rotation of the crank arm step following the vertical lifting of the conductor step.

In an embodiment, the vertical actuating mechanism is a vertical actuator and the actuator for rotation of the crank arm is a rotation actuator, wherein the vertical actuator and rotation actuator operate sequentially to, first, vertically lift the conductor, and, second, to rotate the conductor through an arc.

In another embodiment, in order to accomplish this sequencing, a lower end of the crank arm, to which the insulator is mounted, is telescopic as so as to be telescopically retractable up into, and telescopically extendable downwardly from, the upper end of the crank arm. The rotation actuator may also employ a mechanism, described herein, which acts as the vertical actuator to telescopically actuate the lower end of the crank arm relative to the upper end.

Thus for example, where the rotation actuator includes a tensioning device such as a hydraulic actuator, screw drive, first winch or the like, tensioning a first elongate member which is coupled to the upper end of the crank arm for rotation of the crank arm, the vertical actuator may include a second winch or other tensioning device acting in concert with the rotation actuator, for example by piggy-backing on the rotation actuator, as described more fully below, which tensions a second elongate member to elevate or lower the lower end of the crank arm. Thus the vertical actuator acts on the lower end of the crank arm so that, upon initial tensioning of the second elongate member, firstly the lower end of the crank arm is telescopically elevated relative to the upper end of the crank arm, and, secondly, once the lower end of the crank arm is elevated, then tensioning of the first elongate member by the rotation actuator draws the uppermost end of the upper crank arm towards the support arm so as to pivot the crank arm about the cantilevered end of the support arm. In an embodiment a selectively actuable brake, lock-out or other form of rotation inhibitor may be provided acting on the crank arm so as to inhibit rotation of the crank arm until after the lower end of the crank arm has been telescopically retracted to vertically lift the conductor.

The initial upward telescopic translation of the lower part of the crank arm also thereby elevates the generally vertically disposed insulator and the wire holder mounted to the bottom of the insulator. When the conductor is held within the wire holder, the loading due to the weight of the conductor on the insulator to be replaced, for example, is relieved. Once the conductor has been uncoupled from the old insulator, that is from the insulator requiring repair or replacement, the rotation of the crank arm and insulator will carry the conductor in the wire holder in a circular arc about the pivot point of the crank arm on the cantilevered end of the support arm to thereby rotate and elevate the energized conductor out of the work zone. The present disclosure further includes the corresponding method of operating the apparatus.

BRIEF DESCRIPTION OF THE DRAWINGS

FIG. 1A is an alternative embodiment of the apparatus of FIG. 1.

FIG. 2 is, in side elevation view, the temporary support apparatus of FIG. 1 mounted onto a vertical support of a transmission line tower so as to extend cantilevered outwardly alongside a cross arm of the tower.

FIG. 7 is an alternative embodiment of the temporary support apparatus according to the present disclosure, illustrating the use of other forms of tensioning devices to rotate the crank arm about the end of the support arm.

FIG. 8A is, in side elevation view, a further embodiment of the temporary support apparatus according to the present disclosure, illustrating an alternative arrangement of actuator and crank arm the use of a pulley mounted to the lowermost end of the insulator in place of the wire holder of FIG. 1.

FIG. 8B is the temporary support apparatus of FIG. 8A shown in its actuated position so as to rotate the crank arm about the end of the support arm.

FIG. 9A is, in side elevation view, a further embodiment of the temporary support apparatus according to the present disclosure, wherein the crank arm provides a laterally outward offset for the insulator relative to the end of the support arm.

FIG. 9B is the temporary support apparatus of FIG. 9A shown in its actuated position so as to rotate the crank arm about the end of the support arm.

FIG. 12B is the temporary support apparatus of FIG. 12A, showing the crank arm rotated from the vertical to the horizontal.

FIG. 13A is, in side elevation view, a further alternative embodiment of the temporary support apparatus of FIG. 11A, wherein the actuator is a helical screw drive.

FIG. 13B is the temporary support apparatus of FIG. 13A, showing the crank arm rotated from the vertical to the horizontal.

FIG. 14A is, in upper perspective view, a further alternative embodiment of the temporary support apparatus mounted onto a vertical support of a transmission line tower so as to extend alongside a cross arm of the tower.

DETAILED DESCRIPTION

Figure 10A:
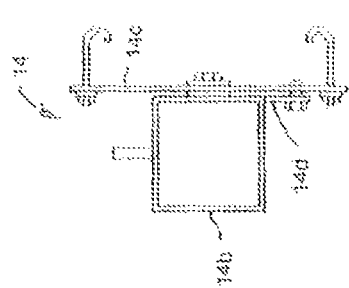
FIG. 10A is, in enlarged view, the mounting bracket of FIG. 1.
Figure 10B:
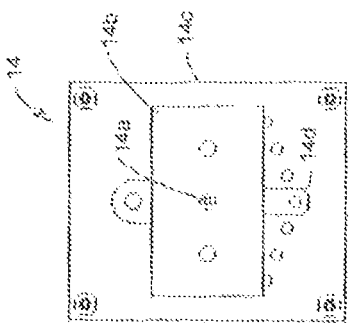
FIG. 10B is, in right side elevation view, the mounting bracket of FIG. 10A.

As seen in the accompanying drawings wherein similar characters of reference denote corresponding parts in each view, the temporary support apparatus 10 for providing temporary support to an energized conductor and a means for relocating the energized conductor out of a work zone includes a support arm 12 having a base end 12a and a cantilevered end 12b. A mounting bracket 14, better seen in FIGS. 10A and 10B, is adjustably mounted onto base end 12a. A crank arm 16 is pivotally mounted at pivot 18 to cantilevered end 12b. Crank arm 16 includes in particular an upper crank arm 16a and a lower crank arm 16b. A rotation actuator 20 is mounted to support arm 12, to actuate rotation of crank arm 16 about pivot 18 by tensioning a first elongate member such as cable 22 alone, or in the alternative embodiment described below, by tensioning a rigid first elongate member such as linkage member 40. An insulator 24 and corresponding wire holder 26 are mounted to, so as to depend downwardly from, lower crank arm 16b.

Mounting bracket 14 is adjustable in position along the length of base end 12a of support arm 12 by the use of a removable fastener, such as pin 14a mounted through apertures formed in a slide collar 14b through which is snugly and slidably journaled the base end 12a. Base end 12a includes a spaced apart array of apertures which, depending on the position to which collar 14b is slid, may be aligned with the aperture in collar 14b through which pin 14a is placed so that pin 14a registers with one of the apertures along base end 12a to thereby provide for locking the position of mounting bracket 14 relative to support arm 12.

Collar 14b may be pivotally mounted onto base plate 14c by means of a pivot arm 14d pivotally mounted at for example an upper end thereof, so as to allow the rotation of the opposite end of pivot arm 14b to thereby adjust the angle of the base plate relative to base end 12a.

Actuator 20 may be a linear actuator such as a hydraulic actuator, screw or first winch for example, or other selectively or manually operable tensioning device. In the embodiments of FIGS. 1-7, cable 22 passes under pulley 28a mounted on support arm 12 between actuator 20 (not shown to scale) and the distal end of cantilevered end 12b, and over pulley 28b mounted on the uppermost end of upper crank arm 16a, and around pulley 28c which is mounted on upper crank arm 16a aligned vertically over lower crank arm 16b. Cable 22 passes around pulley 28d mounted at the lower end of lower crank arm 16b. Cable 22 returns upwardly to where it is attached to upper crank arm 16a for example, mounted vertically above lower crank arm 16b. Actuator 20 thus serves both as the rotation actuator and the vertical actuator. Initially, the tensioning actuation by actuator 20 in direction A tensions cable 22 around the pulleys 28a-28d to impart a vertical elevating tension in direction B, thereby urging the vertical translation of lower crank arm 16b telescopically upwardly in direction C into the female receiving tube within the lowermost end of upper crank arm 16a. Because insulator 24 and wire holder 26 are rigidly mounted to, so as to depend vertically downwardly from, the lowermost end of lower crank arm 16b, upward translation in direction C of lower crank arm 16b thereby correspondingly also elevates insulator 24 and wire holder 26.

Figure 1:
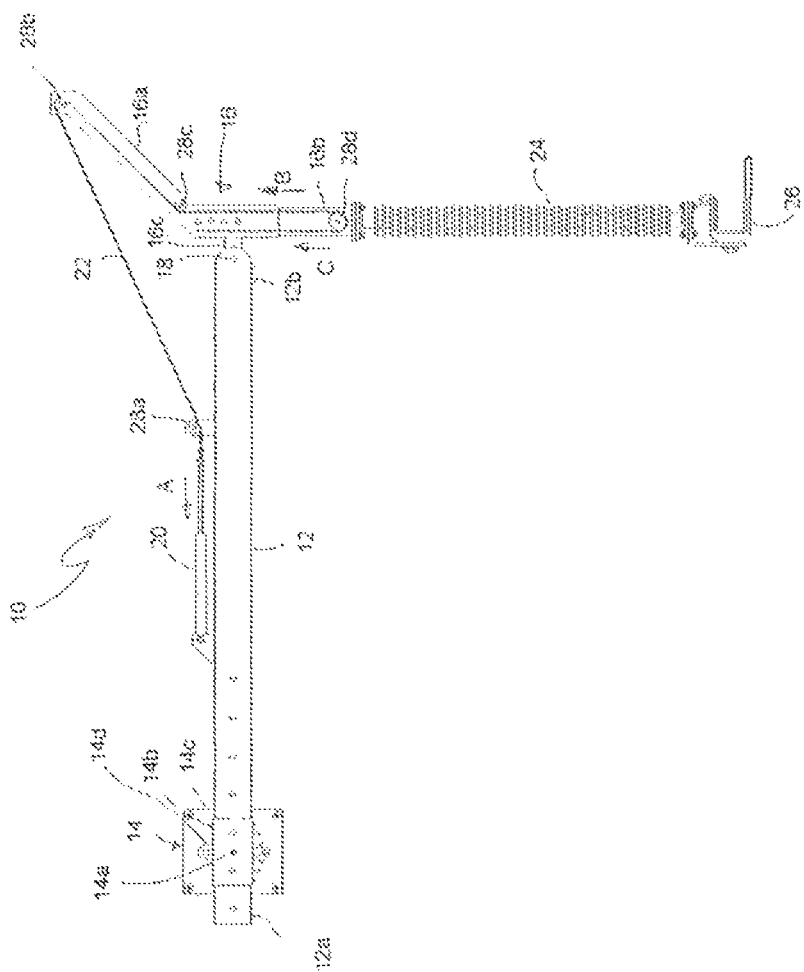
FIG. 1 is, in side elevation view, the complete temporary support apparatus for supporting energized conductors according to one embodiment of the present disclosure.
Figure 3:
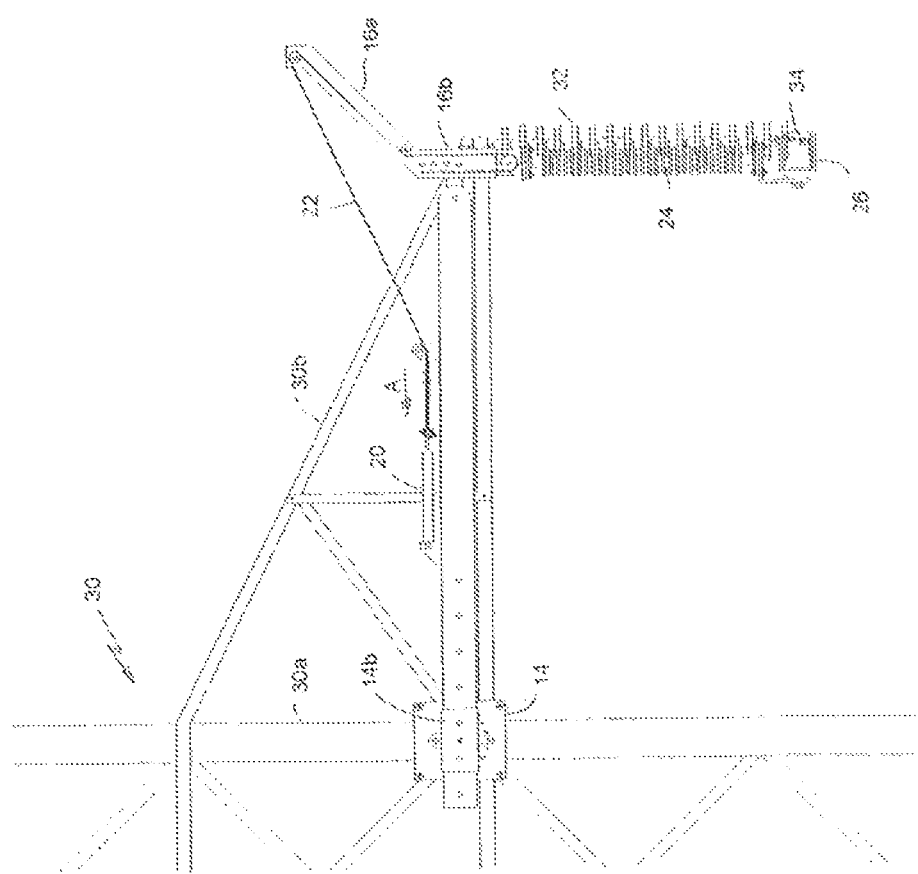
FIG. 3 is the temporary support apparatus of FIG. 2, with the insulator of the temporary support apparatus elevated so as to support the weight of the conductor captured in the wire holder at the bottom of the insulator.
Figure 4:
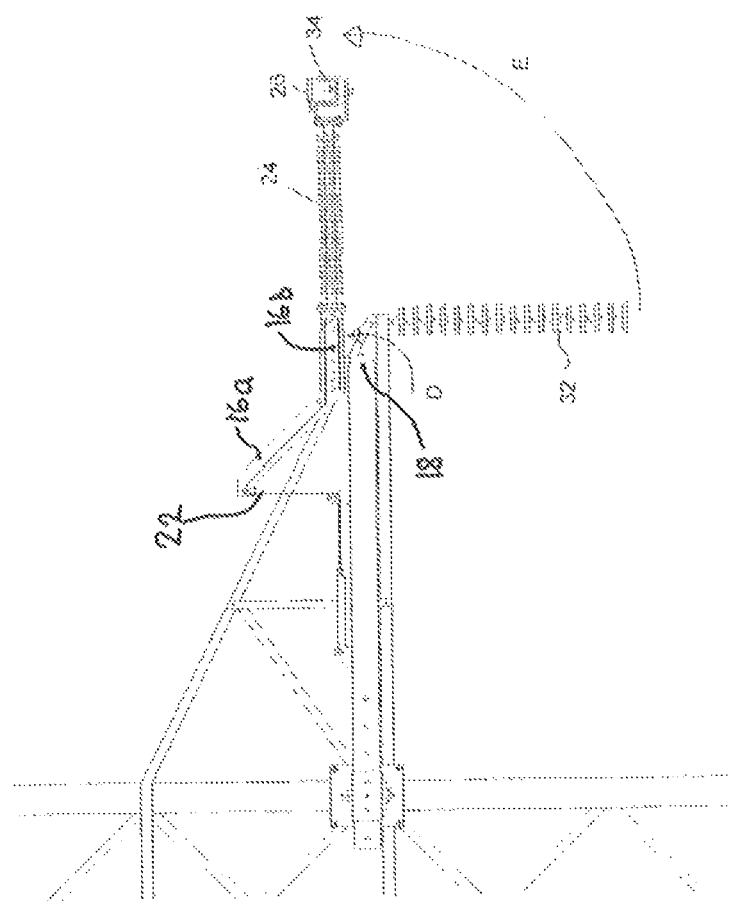
FIG. 4 is the temporary support apparatus of FIG. 2, actuated so as to pivot the crank arm, insulator and wire holder about the cantilevered end of a support arm of the apparatus, so as to thereby elevate the conductor captured within the wire holder.
Figure 5:
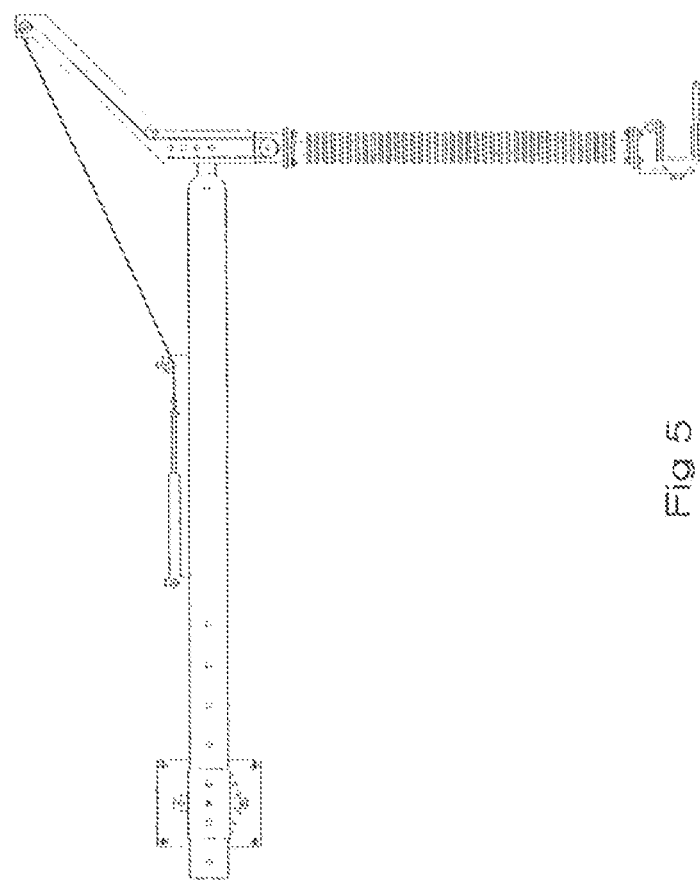
FIG. 5 is the temporary support apparatus in its elevated position, as shown in FIG. 3.
Figure 6:
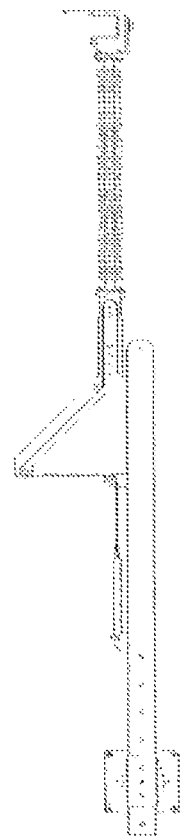
FIG. 6 is the temporary support apparatus in its actuated position, as shown in FIG. 4.

As seen in FIGS. 2-4, where the temporary supporting apparatus 10 of FIG. 1 has been mounted onto an upright member 30a of a transmission tower 30, mounting bracket 14 is rigidly fastened onto upright member 30a and support arm 12 is translated horizontally outwardly of mounting bracket 14 and then locked into position within slide collar 14b, so as to position crank arm 16, insulator 24 and wire holder 26 adjacent, respectively, the distal end of cross arm 30b. Old insulator 32 is mounted to the distal end of cross arm 30b. Conductor 34 is mounted to the lowermost end of insulator 32. With conductor 34 captured in wire holder 26, as seen in FIG. 3, actuation of actuator 20 so as to tension cable 22 in direction A elevates lower crank arm 16b in direction C upwardly telescopically into the lowermost hollow end of upper crank arm 16a, thereby lifting conductor 34 in wire holder 26 to take up and support the weight of conductor 34, thereby allowing old insulator 32 to be uncoupled from conductor 34.

With conductor 34 uncoupled from insulator 32, further tensioning of cable 22 in direction A rotates crank arm 16 in direction D (see FIG. 4) about pivot 18 as cable 22 becomes taut; that is, once lower crank arm 16b has been elevated to the full extent of its linear vertical travel, so that further tensioning of cable 22 pulls pulley 28b towards pulley 28a. The rotation of crank arm 16 in direction D thereby also rotates insulator 24 from its downward vertical position into a raised or elevated position; for example, a substantially horizontal position, thereby carrying conductor 34 in an upward circular arc E away from old insulator 32. This clears conductor 34 from the necessary work zone, allowing the linemen, in this instance, to work on old insulator 32. Once the refurbishment or replacement of old insulator 32 has been completed, actuator 20 is actuated oppositely from the raising operation, so as to allow cable 22 to extend from actuator 20 thereby allowing crank arm 16 to rotate downwardly in a direction opposite direction D, lowering insulator 24, wire holder 26 and conductor 34 to a returned or fully lowered position corresponding to the original position of conductor 34 (as seen in FIG. 2), whereby conductor 34 may be recoupled onto a newly replaced insulator 32.

Conductor 34 is released from wire holder 26 once the lower crank arm 16*b* has been lowered to its fully lowered position by the complete detensioning of cable 22 and conductor 34 is recoupled to the new insulator 32.

In another embodiment, as seen in FIG. 1A, a selectively operable brake is provided, such as by replacing the shaft of pivot 18 with a threaded bolt and mating nut 18' which may be selectively tightened to compress cantilevered end 12*b*, for example where end 12*b* is formed as a spaced apart pair of ears 12*c* sandwiching the mounting arm 16*c* of crank arm 16 therebetween. Mating nut and bolt 18' compress the ears 12*c* together, increasing the friction and thereby resisting rotation of mounting arm 16*c*, and thus resisting the rotation in direction D of the entire crank arm 16. By selectively inhibiting the rotation of crank arm 16, the lower end 16*b* of the crank arm will retract in direction C upon tensioning of cable 22 before the crank arm rotates in direction D to thereby sequence the upward telescoping of lower crank arm 16*b*. As would be known to one skilled in the art, the use of nut and bolt 18' as a selectively operable brake is just one example of how crank arm 16 may be restrained from rotation until after the lower end 16*b* has elevated, as other forms of brakes or lock-outs, such as by the use of locking pins, latches, etc., may be employed. In this fashion, a break or discontinuity is provided in the sequencing of the actuation of the vertical actuator followed by actuation of the rotation actuator.

In an alternative embodiment shown in FIG. 7, actuator 20 is replaced with a manual cranking arrangement, for example employing a second winch 21 for tensioning cable 22. In a further alternative embodiment, a static support cable or flexible member 24*a* (shown in dotted line in FIG. 7) is employed in tension between the uppermost end of upper crank arm 16*a* and the lowermost end of insulator stack 24. Support cable or member 24*a* serves to support insulator stack 24 as it is rotated about pivot 18 in direction D. Upper crank arm 16*a* may be angled outwardly by an inclined angle alpha (α) of, for example, approximately 135 degrees. Upper crank arm 16*a* is of sufficient length so that tension on cable 22 imparts a moment sufficient to rotate the crank arm, insulator stack, wire holder and conductor in direction D, so that the resulting tension on flexible member 24*a* supports the insulator stack laterally as it is rotated.

The apparatus articulation, extension and retraction may be accomplished using two separate actuators and/or cables, for example as described below in relation to FIGS. 14A-14C and 17. FIGS. 1-7 indicate a 2:1 mechanical advantage using one pulley; but additional pulleys could be added to lift heavier loads.

In the alternative embodiments of FIGS. 8A, 8B, 9A and 9B, actuator 20 is directly connected to crank arm 16 without the use of cable 22. That is, the prime mover or cylinder of the actuator 20 engages the crank arm 16 directly via the cylinder rod 20*a*; in other words, the driving member of the cylinder. In FIGS. 8A and 8B, conductor holder 26 is replaced with pulley 26*a*. As may be seen in comparing the crank arm 16 of FIGS. 8A and 9A, crank arm 16 may have more or less offset at its opposite ends, relative to pivot 18. In the simplified embodiments of FIGS. 8A and 9A, no mechanism is provided for elevating a lower crank arm 16*b* relative to an upper crank arm 16*a*.

Figure 11A:
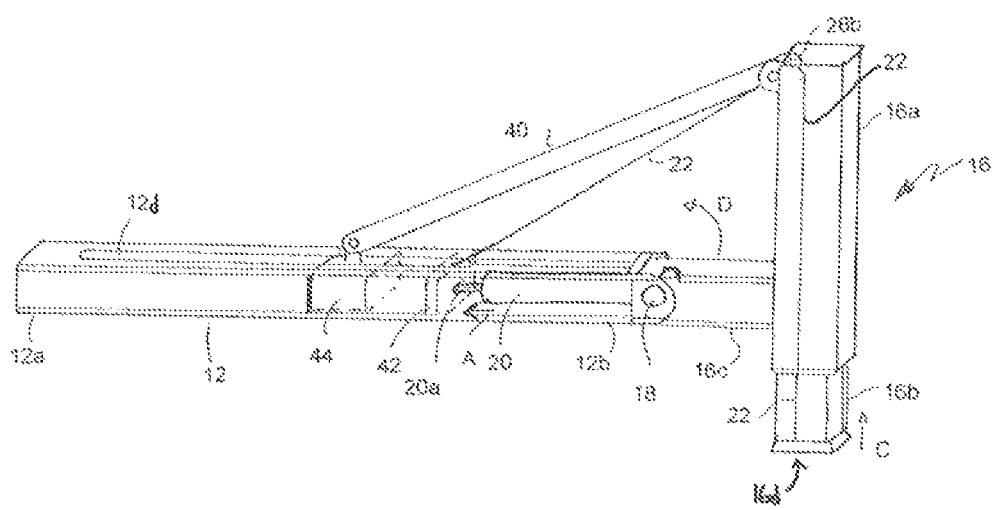
FIG. 11A is, in upper perspective view, a further alternative embodiment of the temporary support apparatus according to the present disclosure wherein an actuator mounted internally within the support arm translates two-stage traveller blocks to produce a corresponding two-stage actuation of the crank arm by firstly elevating the lower crank arm and secondly pivoting the entire crank arm so as to rotate the crank arm from the vertical to the horizontal.
Figure 11B:
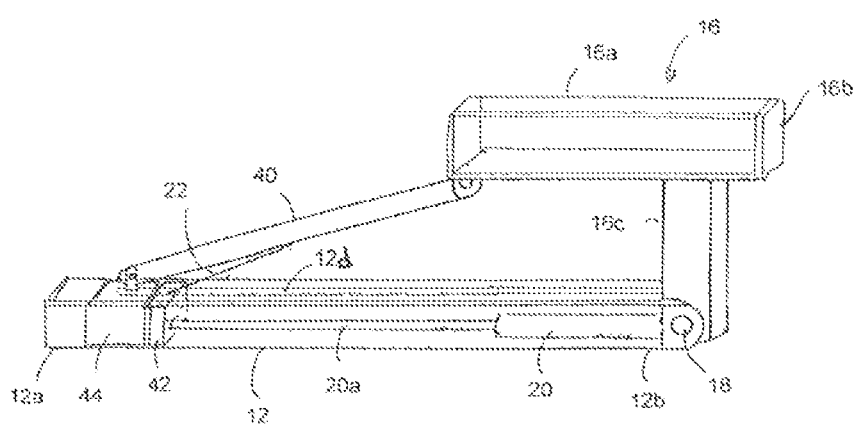
FIG. 11B is the temporary support apparatus of FIG. 11A, showing the crank arm rotated from the vertical to the horizontal.

In a further alternative embodiment, illustrated in FIGS. 11A-11B, an internal cylinder actuator is provided. Tensioning is provided by both a cable 22 and a rigid linkage member 40. The cable 22 attaches directly to the lower crank arm 16*b*. The cable 22 is routed internally up through the crank arm 16 and exits the top of the upper crank arm 16*a* through a shiv or pulley 28*b* where the rigid linkage member 40 is attached. In a two stage actuation, the rotation actuator 20, which may be a cylinder or a screw actuator, takes up the cable 22 and pulls it the distance required to raise the lower crank arm 16*b* so as to lift the conductor 34. The actuator 20 then contacts the rigid linkage member 40 and from that point the linkage member 40 and cable 22 move together along the support arm 12. Thus as seen in the further alternative embodiment of FIGS. 11A and 11B, actuator 20 is mounted internally within support arm 12 and is oriented for actuation in a reverse direction (as compared to the embodiment of FIG. 1). In particular, the driving member or cylinder rod 20*a* extends from cylinder 20 towards base end 12*a* of the support arm so as to translate traveller block 42 attached to cable 223 also towards base end 12*a*, thereby tensioning cable 22. Cable 22 extends upwardly from traveller block 42 and over pulley 28*b* at the upper end of upper crank arm 16*a*, then extends downwardly through the hollow crank arm 16, and in particular downwardly through upper crank arm 16*a* and lower crank arm 16*b* to the lower end or base 16*d* of lower crank arm 16*b* where the cable 22 is affixed to lower crank arm 16*b*.

Thus when rod 20*a* is extended in direction A, traveller block 42 is driven towards traveller block 44 within arm 12 thereby tensioning cable 22 and drawing upwardly the lower crank arm 16*b* in direction C. Cable 22 is of sufficient length so that as traveller block 42 engages against traveller block 44, lower crank arm 16*b* telescopically retracts into upper crank arm 16*a*. Once traveller block 42 engages against traveller block 44, further extension of rod 20*a* from cylinder 20 pushes both traveller blocks 42 and 44, thereby drawing rigid linkage member 40, connected to traveller block 44, downwardly and along support arm 12 towards base end 12*a*. Drawing linkage 40 thusly pulls the upper end of upper crank arm 16*a* over pivot 18, thereby rotating crank arm 16 in direction D from the position shown in FIG. 11A to the fully rotated position shown in FIG. 11B. An insulator 24 mounted to the base 16*d* of lower crank arm 16*b* (not shown in FIGS. 11A or 11B, but shown in FIGS. 12A and 12B) is rotated from a vertical alignment in FIG. 11A to a horizontal alignment in FIG. 11B thereby rotating, for example a conductor holder 26 or a pulley 26*a*, mounted to insulator 24 (not shown) upwardly and out of the way. Thus as seen in FIG. 11B, and although not shown to scale, cylinder rod 20*a*, when fully extended from cylinder 20, has pushed traveller block 42 and traveller block 44 almost completely to the end of base end 12*a* thereby drawing the lowermost ends of cable 22 and linkage 40 along slot 12*d* until, at the end of slot 12*d*, crank arm 16 has been rotated to the horizontal. When it is desired to return crank arm 16 to the vertical, so as to lower insulator 24, rod 20*a* is retracted into cylinder 20 thereby drawing traveller blocks 42 and 44 towards cylinder 20 in a direction opposite direction A. The weight of insulator 24 acting about pivot 18 causes crank arm 16 to rotate downwardly in a direction opposite to direction D, thereby drawing linkage 40 and traveller block 44 along with crank arm 16 so as to translate traveller block 44 towards cylinder 20.

Figure 12A:
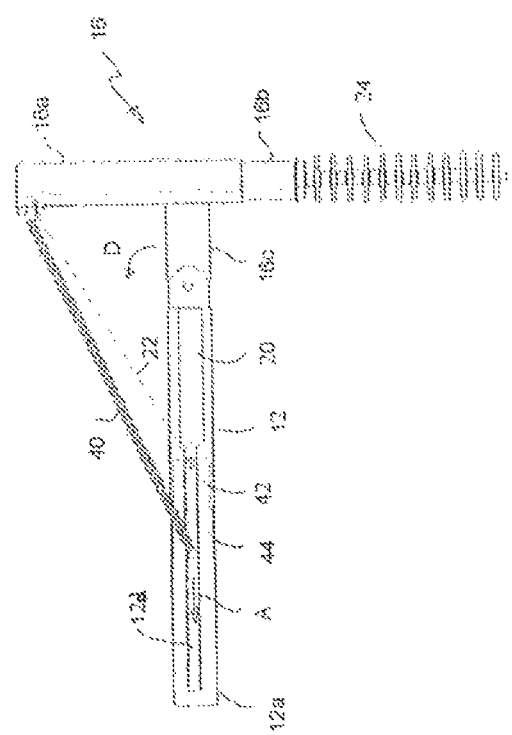
FIG. 12A is, in side elevation view, an alternative embodiment of the temporary support apparatus of FIG. 11A.

In an alternative embodiment of FIGS. 12A and 12B, a different form of traveller blocks 42 and 44 are illustrated wherein traveller block 42 slides over or alongside, so as to overlap, traveller block 44. Once traveller block 42 has been slid completely alongside traveller block 44, traveller block 44 is picked up by traveller block 42 so that both traveller blocks then continue sliding along support arm 12 in direction A, again thereby drawing the lowermost ends of linkage 40 and cable 22 along slot 12d, wherein, in FIG. 12A, slot 12d is positioned along a side surface of arm 12.

In a further alternative embodiment shown in FIGS. 13A and 13B, cylinder 20 and corresponding rod 20a are replaced with what is shown diagrammatically as a helical screw drive 46 wherein a motor (not shown) drives rotation of threaded rod 46a thereby conveying a correspondingly threaded follower 46b along threaded rod 46a to once again draw, firstly, cable 22 (connected to follower 46b) in direction A to thereby elevate lower crank arm 16b in direction C; and, secondly, once cable 22 has been drawn sufficiently along slot 12d, follower 46b engages the traveller 44 corresponding to linkage member 40 to thereby simultaneously draw the lower end of linkage member 40 also along slot 12d towards base end 12a of support arm 12. As before, this rotates crank arm 16 in direction D so as to rotate insulator 24 from the vertical to the horizontal as seen in FIG. 13B.

Figure 14B:
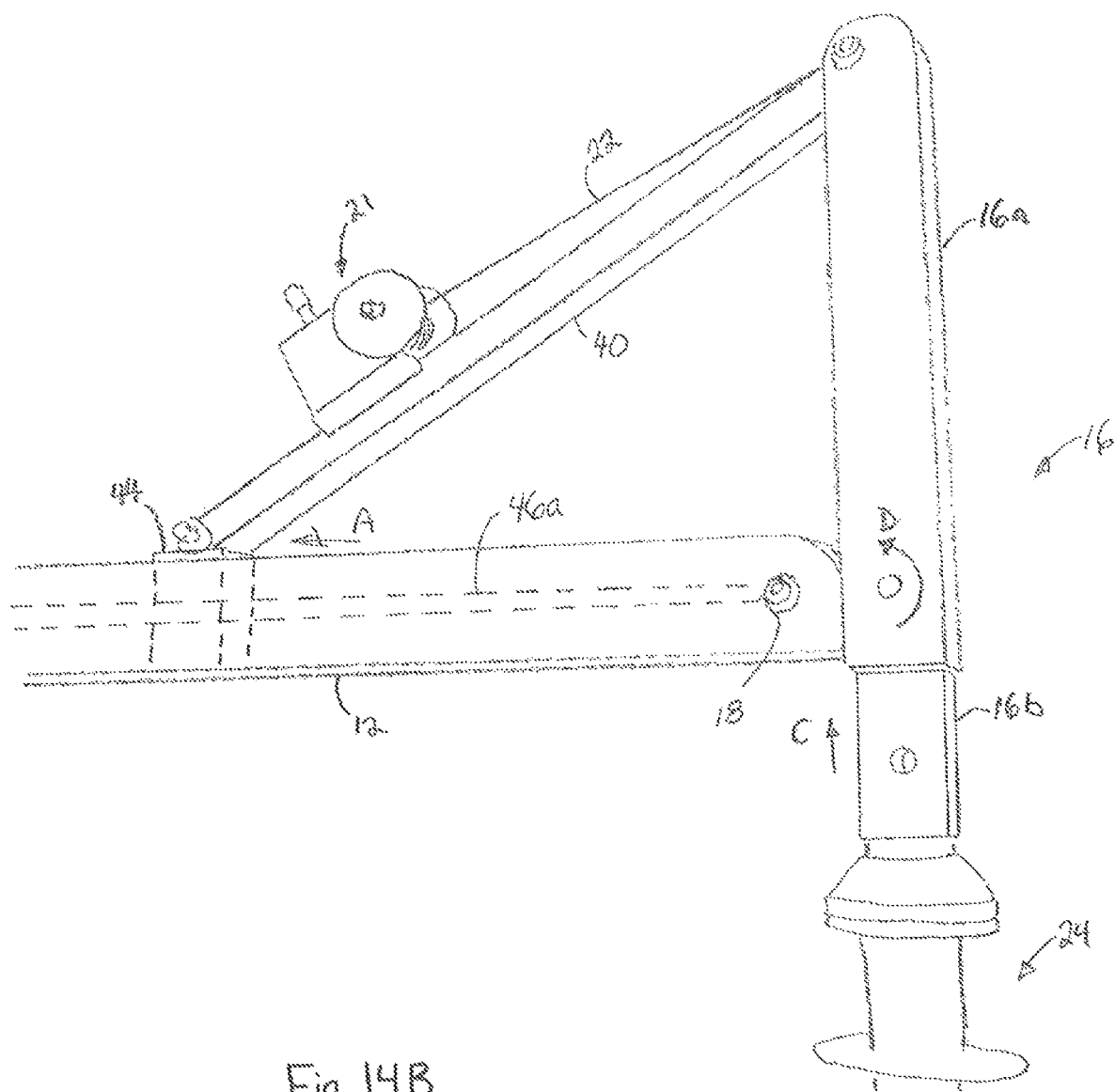
FIG. 14B is, in side elevation view, a close up view of the crank-arm end of the temporary support apparatus of FIG. 14A.
Figure 14C:
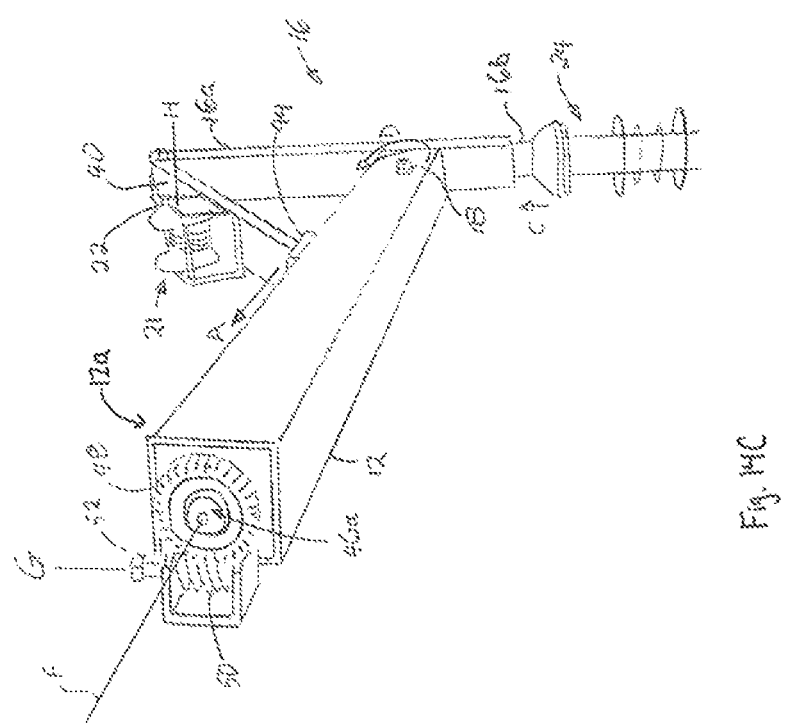
FIG. 14C is a rear perspective view of the temporary support apparatus of FIG. 14A.

A further embodiment employing screw drive 46 is seen in FIGS. 14A-14C. As before, screw drive 46 includes a threaded rod 46a mounted within support arm 12. The base end of threaded rod 46a is seen FIG. 14C. Threaded rod 46a is also shown, partially cut-away, in dotted outline in FIG. 14B. Traveller block 44 shown partially in dotted outline, is mounted in threaded engagement on threaded rod 46a so that rotation of rod 46a about its longitudinal axis F translates traveller block 44 along slot 12d in direction A or reverse to direction A, depending on the direction of rotation of rod 46a. Linkage member 40 connects traveller block 44 to upper crank arm 16a. Crank arm 16 is pivotally mounted at pivot 18 on the distal end of support arm 12 for rotation of crank arm 16 in direction D in a vertical plane. Pivoting crank arm 16 also pivots insulator 24 mounted on the lower end of lower crank arm 16b and shown partially cut-away in FIGS. 14A-14C. Crank arm 16 pivots in direction D as traveller block 44 moves in direction A, carrying linkage member 40 with it.

In the embodiment of FIG. 14C, which is not intended to be limiting, a crown gear 48 is mounted on the exposed base end of threaded rod 46a, exposed on the base end 12a of support arm 12. Crown gear 48 is rigidly mounted to, so as to be orthogonal to, threaded rod 46a so that rotation of crown gear 48 about axis F also rotates threaded rod 46a. A worm gear 50 is mounted so as to engage with, and drive rotation of, crown gear 48. Worm gear 50 is shown mounted vertically, but this is not intended to be limiting. A shaft having a hexagonal head, or bolt head 52, extends from worm gear 50 along its axis of rotation G. Bolt head 52 is advantageously sized so as to snugly fit into a standard socket (not shown) of the kind sold commercially and adapted for fitting to a hand drill (not shown) for example. Thus a lineman carrying a rechargeable hand drill having the appropriately sized socket mounted thereon merely has to place the socket onto bolt head 52 and, using the hand drill, rotate worm gear 50 in order to rotate threaded rod 46a to thereby pivot crank arm 16.

Second winch 21, shown in FIGS. 14B and 14C, is mounted onto the upper side of linkage member 40. Cable 22 may be extended from, or retracted onto, winch 21 by the conventional actuation of the winch about axis of rotation H, for example by the use of a manual crank handle (not shown) or for example by the use of a crown gear and worm gear arrangement, so that winch 21 may be actuated by use of a hand drill, in a manner similar to rotating threaded rod 46a as described above and illustrated in FIG. 14C. As before, cable 22 extends through and along upper crank arm 16a so as to be connected to the lowermost end of lower crank arm 16b. Actuation of winch 21 telescopically elevates lower crank arm 16b into, or lowers the lower crank arm 16b from, upper crank arm 16a to raise or lower insulator 24.

Figure 17:
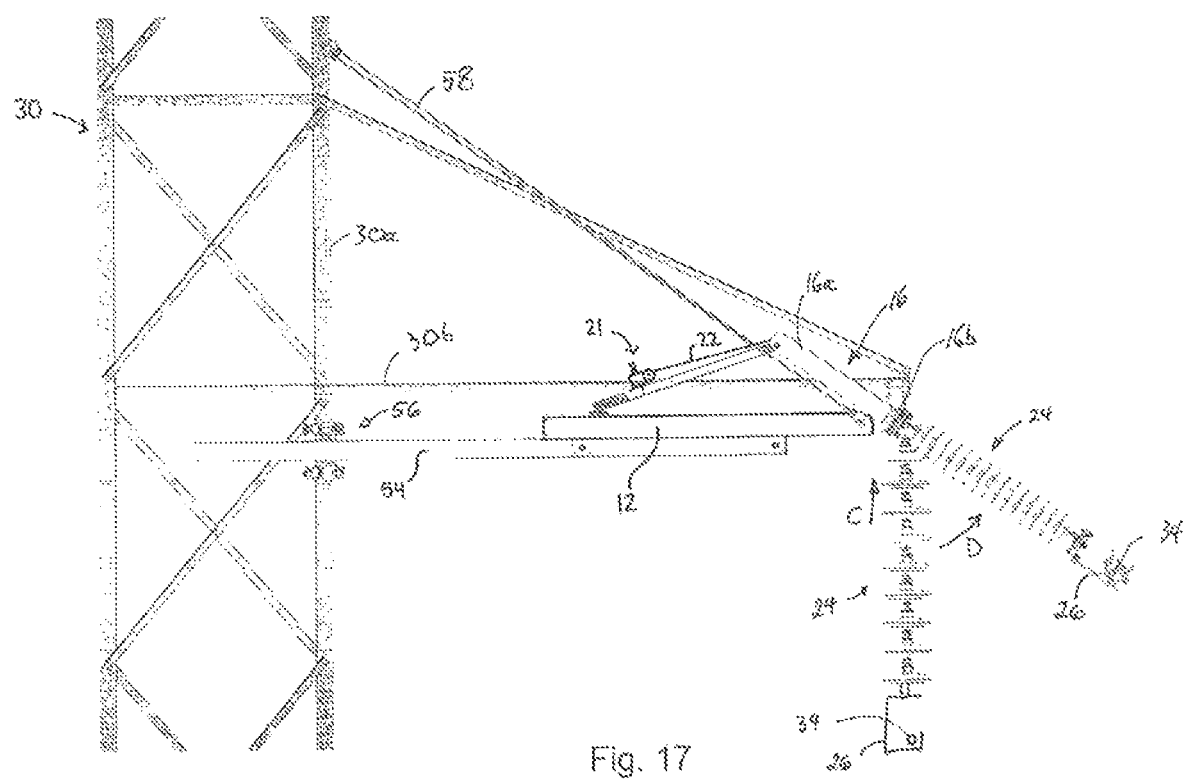
FIG. 17 is, in side elevation view, the temporary support apparatus of FIG. 14A, showing the crank arm rotated partway between the vertical and horizontal positions.

Advantageously, winch 21 is positioned on the linkage member 40 so as to maintain tension in the cable 22 and thereby maintain the lower crank arm 16b in an elevated position during actuation of the screw drive 46 to rotate crank arm 16 in direction D, such as illustrated in FIG. 17. Positioning winch 21 on the linkage member 40 additionally makes it easier to access by a linesman so as to operate the winch 21, for example by using a manual crank handle or a powered hand drill tool, as described above, as opposed to mounting the winch 21 on upper crank arm 16a, which would increase the distance between winch 21 and a linesman climbing the tower 30 to access support arm 12.

Figure 14D:
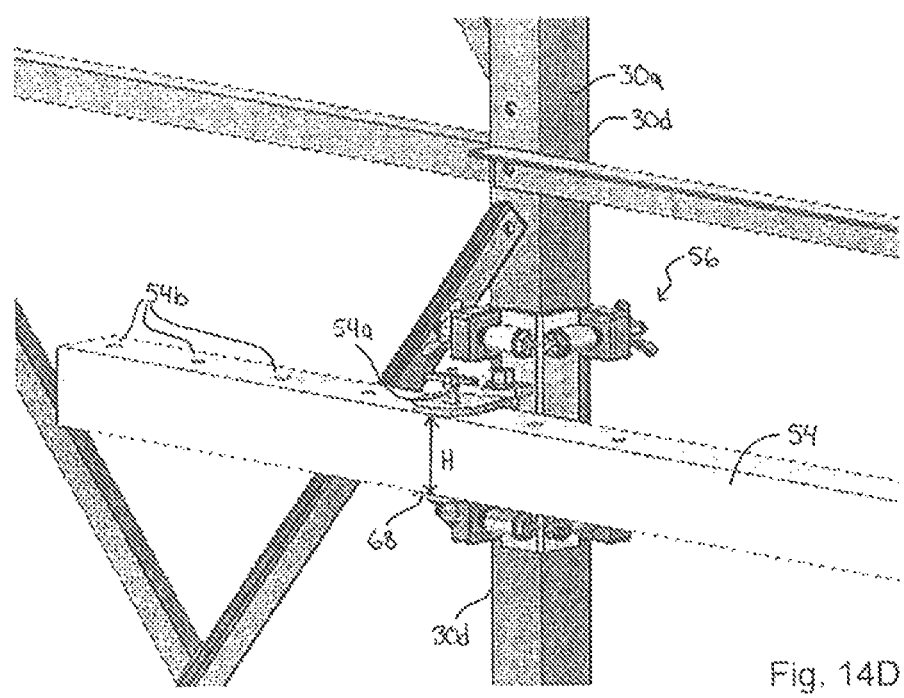
FIG. 14D is a close-up view of the base end of the temporary support apparatus of FIG. 14A.
Figure 15:
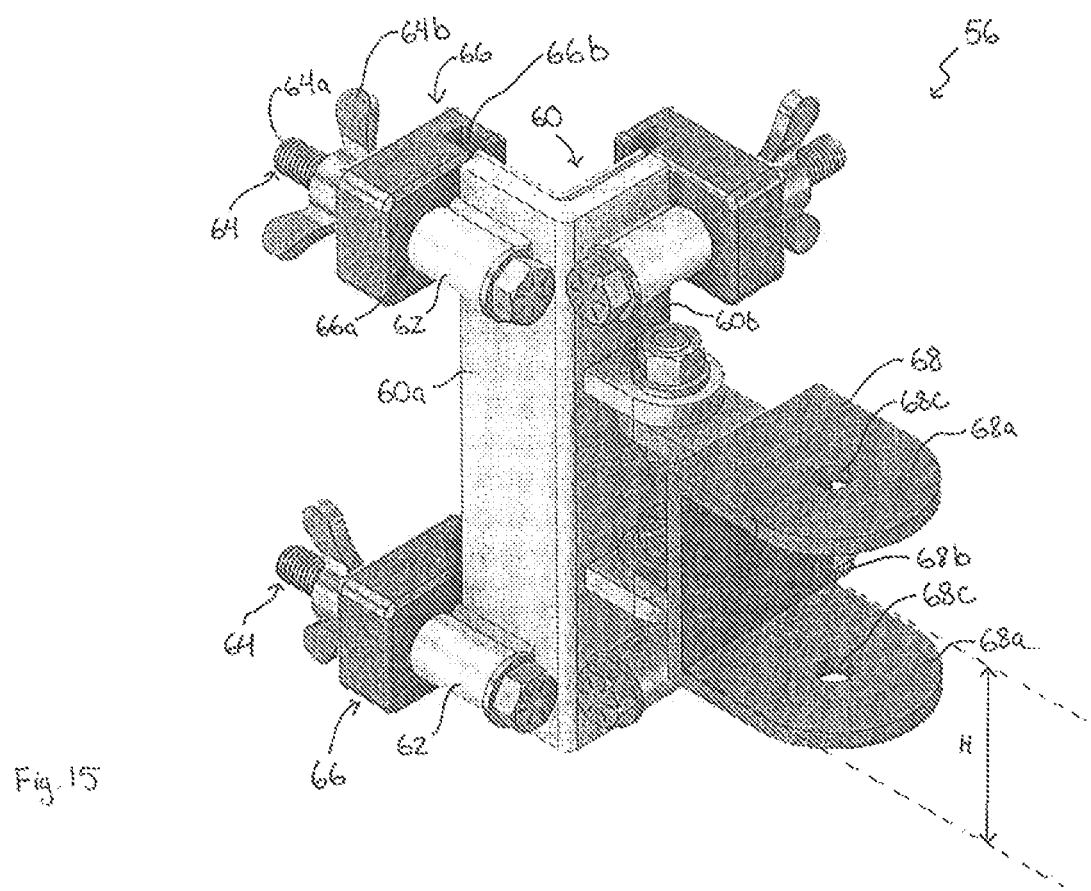
FIG. 15 is, in upper perspective view, the mounting bracket shown in FIGS. 14A and 14D.
Figure 16:
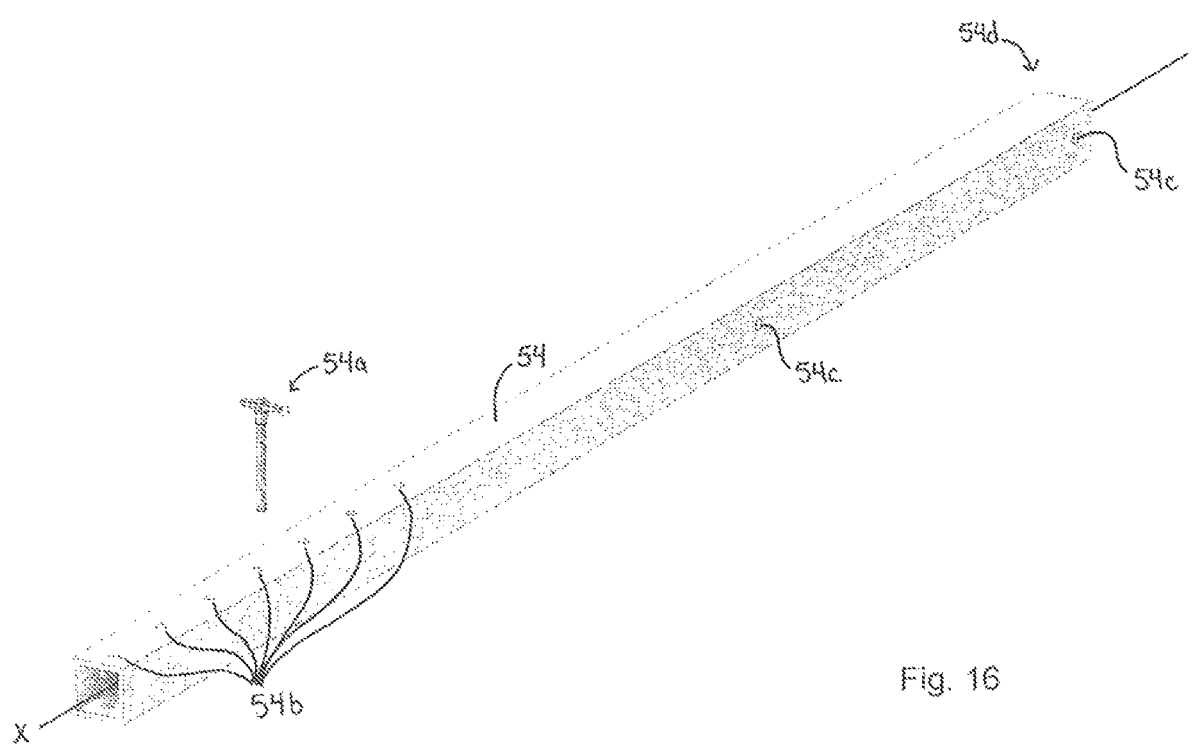
FIG. 16 is, in perspective view, the cantilevered arm shown in FIG. 14A.

As seen in FIG. 14A, support arm 12 may be mounted onto a cantilevered arm 54, itself mounted to tower 30 by mounting bracket 56, better seen in FIGS. 14D and 15. Guy wires 58, which extend from tower 30 to support arm 12, may be used to laterally stabilize the free end of arm 54 and support arm 12, as well as to help carry the vertical load of the weight of the conductor held by insulator 24. Further lateral stabilizers (not shown) such as rigid or flexible members or bracing, may be employed to further laterally stabilize the free end of the arm 54 and support arm 12.

Mounting bracket 56 comprises an L-shaped flange 60, having first and second wings 60a, 60b for engaging a corner edge 30c of an upright member 30a of the transmission tower 30. An outer surface of each wing 60a, 60b supports two bolt sleeves 62, spaced vertically apart from one another and sized to snugly receive a threaded bolt 64. Mounting blocks 66, each having a smooth bore 66a for receiving a portion of the bolt 64 and a slot 66b for receiving an outer edge 30d of the upright member 30a, are slid onto the distal ends 64a of each bolt 64 protruding from sleeve 62. A threaded wingnut 64b is threaded onto the distal ends 64a of each bolt 64 to thereby sandwich the mounting block 66 between the sleeve 62 and wingnut 64b.

Mounting bracket 56 further includes a C-shaped bracket 68 for engaging and securing the cantilevered arm 54 to the upright member 30a of the tower 30. C-shaped bracket 68 is mounted to, or may be integrally formed with, the outer surface of one of the wings 60a or 60b of the L-shaped flange 60, positioned between the spaced-apart pair of bolt sleeves 62. C-shaped bracket 68 includes a pair of horizontal arms 68a, 68a extending orthogonally relative to the surface of wing 60a or 60b, and is separated by vertical portion 68b. Bores 68c extend through wings 68a, sized to slidingly receive T-bolt 54a to secure the cantilevered arm 54 between the wings 68a. A height H between wings 68a is sized to slidingly and snugly receive cantilevered arm 54 therebetween.

To mount a support arm 12 to tower 30, so as to enable the cantilevered end 12b of arm 12 to reach the old insulator 32 supported on a cross arm 30b, a cantilevered arm 54 may be mounted to a upright member 30a of tower 30 using mounting bracket 56. The bracket 56 is snugly secured to upright member 30a by inserting the outer edges 30d of upright member 30a into the slots 66b of the mounting blocks 66, and then tightening the wingnut 64b so as to compress the slots 66b towards the opposed facing wing 60a or 60b of the L-shaped flange. The cantilevered arm 54 is slid into the C-shaped bracket 68 so as to align one of an array of bores 54b running orthogonally to a longitudinal axis X of the cantilevered arm 54 with the bores 68c running through the wings of the C-shaped bracket 68. Once the bores 54b and 68c are aligned, so as to be co-linear, the T-bolt 54a is inserted through the bores 54c and 68c to thereby secure cantilevered arm 54 to an upright member of the tower 30. The support arm 12 may be mounted to cantilevered arm 54 by means of a pair of mounting brackets 13, 13 extending downwardly from arm 12, which align with a pair of support arm mounting bores 54c for receiving bolts or other fasteners to thereby secure the arm 12 to a free end 54d of cantilevered arm 54, as illustrated for example in FIGS. 14D and 17.

It will be appreciated by those skilled in the art that the actuators 20, as employed in the various embodiments described herein, may be of different types and that the embodiments described herein are not limited to the particular types of actuators described in relation to those embodiments. For example, without intending to be limiting, the cylinder actuator 20 employed to drive the travelling blocks 42, 44 in the embodiment illustrated in FIGS. 12A and 12B may be substituted for the screw drive actuator 20 described in the embodiment illustrated in FIGS. 13A and 13B. Further, where herein reference is made to crank arm 16 rotating from vertical to horizontal, it will be understood by one skilled in the art that, depending on the geometry of the actuator relative to the crank arm, the crank arm may not rotate completely to the horizontal, but will still operate to move the conductor out of the work zone. As will be apparent to those skilled in the art in the light of the foregoing disclosure, many other alterations and modifications are possible in the practice of this disclosure without departing from the spirit or scope thereof. Accordingly, the scope of the disclosure is to be construed in accordance with the substance defined by the following claims.

What is claimed is:

1. A conductor lifter adapted to be mounted to a tower for temporarily supporting an energized conductor at the end of an insulator, the conductor lifter comprising:
    a support arm having a base end and an opposite cantilevered end;
    a crank arm having an upper crank arm mounted to a lower crank arm and pivotally mounted on said cantilevered end about a pivotal coupling so that said upper crank arm extends upwardly from said cantilevered end and said lower crank arm extends downwardly from said cantilevered end;
    a first actuator fixedly coupled to said support arm and having a first driver;
    an elongate member mounted to, so as to extend between, said upper crank arm and said first driver so as to rotate the crank arm about the pivotal coupling when the first actuator is actuated;
    a lower end of said lower crank arm adapted to be mounted to an upper end of the electrical insulator, the insulator having a conductor retainer at a lower end thereof; and
    wherein at least a lower end of said lower crank arm is selectively elevatable relative to said upper crank arm to selectively elevate a conductor when held by the conductor retainer; and
    a second actuator coupled to, so as to said selectively elevate, said at least a lower end of said lower crank arm.

2. The conductor lifter of claim 1 wherein said second actuator is mounted so as to transmit a tension loading of said second actuator to said lower crank arm.

3. The conductor lifter of claim 2 wherein said elongate member is a rigid linkage member, and wherein said second actuator is mounted on said linkage member.

4. The conductor lifter of claim 3 wherein the second actuator is mounted on an upper surface of said linkage member.

5. The conductor lifter of claim 4 wherein the second actuator is mounted midway between opposite ends of said linkage member.

6. The conductor lifter of claim 3 wherein said second actuator includes a winch and a retractable cable extending from the winch, over the upper crank arm and down to the at least a lower end of the lower crank arm.

7. The conductor lifter of claim 6 wherein the first actuator is a linear actuator mounted within the support arm to selectively draw the linkage member along the length of the support arm to thereby selectively pivot the crank arm about the pivotal coupling.

8. The conductor lifter of claim 7 wherein said support arm is further adapted for maintaining a substantially horizontal orientation when mounted to said tower.

9. The conductor lifter of claim 6 wherein the upper crank arm is hollow and the cable extends from the winch down through the upper crank arm.

10. The conductor lifter of claim 1 wherein said lower crank arm telescopes relative to said upper crank arm.

11. The conductor lifter of claim 10 wherein said upper crank arm and said lower crank arm pivot about said cantilevered end between a lowered position at which said lower crank arm depends downwardly and an elevated position at which said lower crank arm is rotated upwardly from said lowered position.

12. The conductor lifter of claim 1 wherein the first actuator is a screw drive and the first driver is a threaded rod.

13. The conductor lifter of claim 12 wherein the threaded rod further includes a first gear fixedly coupled to the threaded rod at a base end thereof; and wherein a second gear is operatively coupled to the first gear so as to rotate the first gear and the threaded rod upon actuating the second gear.

14. The conductor lifter of claim 13 wherein the first gear is a crown gear; and wherein the second gear is a worm gear which is operatively coupled to the crown gear so as to rotate the crown gear and the threaded rod upon actuating the worm gear, and wherein the worm gear is adapted to be rotatably driven by a manually operated tool.

15. The conductor lifter of claim 1 wherein the crank arm is pivotally mounted on the support arm so as to rotate relative to the support arm in a vertical plane containing the support arm.

16. A method for temporarily supporting an energized conductor using the conductor lifter of claim 1, the method comprising:
    a) mounting the support arm to a tower adjacent a conductor to be moved,
    b) coupling the conductor to the lower end of an insulator mounted on the lower crank arm when the crank arm is lowered into its lowered position;
    c) uncoupling the conductor from an existing insulator supported on the tower;
    d) actuating the first actuator of the conductor lifter so as to vertically translate the lower crank arm and the conductor towards the upper crank arm and into an elevated position
    e) then actuating the second actuator so as to rotate the crank arm relative to a cantilevered end of the support arm, to thereby translate the conductor from the elevated position to a rotated position.

17. The method of claim 16 wherein the crank arm rotates in a vertical plane containing the support arm.

18. The method of claim 16, further comprising the steps of:
- performing maintenance work on the existing insulator;
- actuating the second actuator so as to rotate the crank arm relative to the cantilevered end of the support arm thereby translating the conductor from the rotated position to the elevated position;
- actuating the first actuator so as to lower the lower crank arm and the conductor away from the upper crank arm and support arm thereby translating the conductor from the elevated position to the lowered position;
- coupling the conductor to the existing insulator;
- uncoupling the conductor from the insulator mounted on the lower crank arm of the conductor lifter.

* * * * *